(12) United States Patent
Menkhoff et al.

(10) Patent No.: US 7,406,492 B1
(45) Date of Patent: Jul. 29, 2008

(54) DIGITAL FILTER COMBINATION FOR INTERPOLATION

(75) Inventors: Andreas Menkhoff, Munich (DE); Herbert Alrutz, Freiburg (DE)

(73) Assignee: Micronas GmbH (DE)

(*) Notice: Subject to any disclaimer, the term of this patent is extended or adjusted under 35 U.S.C. 154(b) by 0 days.

(21) Appl. No.: 08/984,735

(22) Filed: Dec. 4, 1997

(30) Foreign Application Priority Data

Dec. 5, 1996 (EP) .................................. 96119505

(51) Int. Cl.
*G06F 17/10* (2006.01)
(52) U.S. Cl. ...................................... 708/313
(58) Field of Classification Search ................ 708/313
See application file for complete search history.

(56) References Cited

U.S. PATENT DOCUMENTS

| 4,703,353 A | 10/1987 | David .......................... 358/140 |
| 4,760,542 A * | 7/1988 | Mehrgardt et al. ............ 708/301 |
| 4,862,271 A | 8/1989 | Smith et al. ................... 358/166 |
| 5,461,604 A * | 10/1995 | Hasegawa ..................... 708/313 |
| 5,732,107 A * | 3/1998 | Phillips et al. ................. 708/313 |
| 5,751,615 A * | 5/1998 | Brown ........................... 708/313 |

FOREIGN PATENT DOCUMENTS

| EP | 0220880 | 5/1987 |
| EP | 0262647 | 4/1988 |

OTHER PUBLICATIONS

Electronic Letters, vol. 26, No. 19, *Programable Fractional Sample Delay Filter with Lagrange Interpolation*, Sep. 13, 1990.

* cited by examiner

*Primary Examiner*—David H. Malzahn
(74) *Attorney, Agent, or Firm*—Duane Morris LLP

(57) ABSTRACT

A digital filter combination for interpolating primary sample values of a sampled signal using an mth-order discrete-time filter and a kth-order continuous time interpolation filter, with $m \geq 3$ and $k \geq 2$, wherein the discrete-time filter forms n secondary sample values from at least m+1 primary sample values at equal time intervals, with $n \geq m$, and the continuous-time interpolation filter forms from at least part of the n secondary sample values an interpolated value whose temporal position with respect to that of the primary sample values is predeterminable by a normalized interpolating instant $dp = t_{in}/T$, where $t_{in}$ is the absolute interpolating instant, and T is the period of the primary sampling rate.

7 Claims, 2 Drawing Sheets

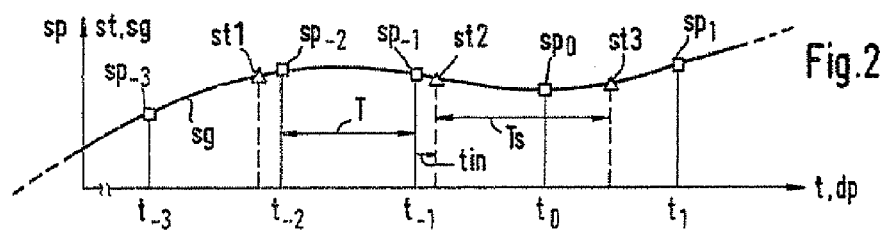
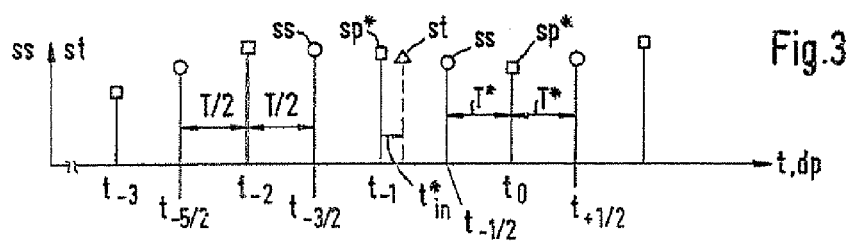
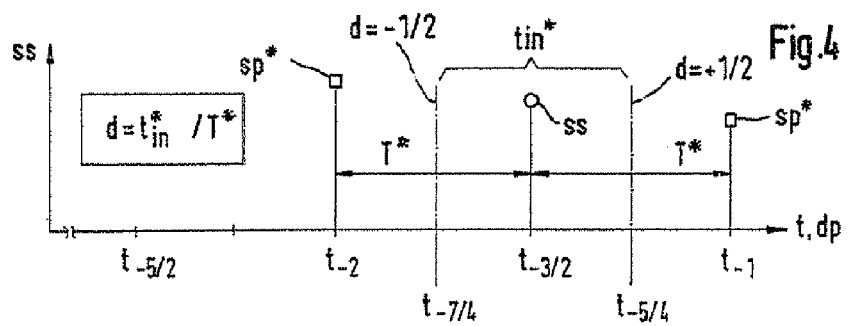
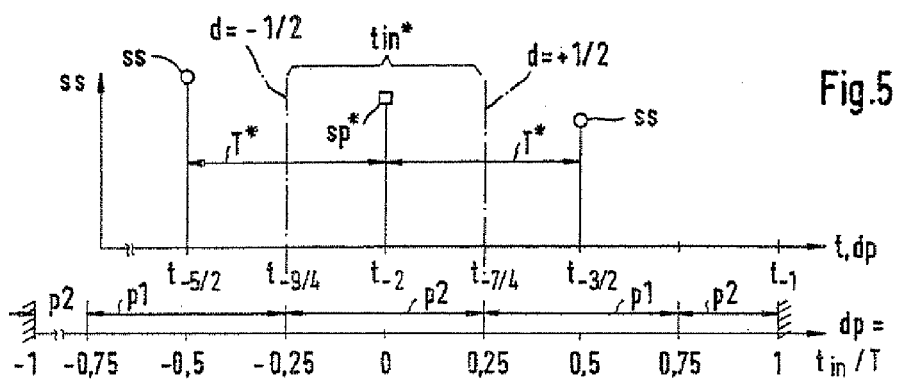

DIGITAL FILTER COMBINATION FOR INTERPOLATION

FIELD OF THE INVENTION

This invention relates to interpolation systems and in particular, to a digital filter combination for the discrete-time interpolation of sample values of a sampled signal.

BACKGROUND OF THE INVENTION

In discrete-time interpolation of sample values of a sampled signal, the sample values must represent a band-limited signal or be band-limited by an appropriate digital filter. By means of the interpolation, the sampling rate is to be changed by an arbitrary numerical ratio, for example, or an intermediate signal value is to be calculated while retaining the respective sampling rate. Such applications are in the processing of digital video and audio signals, particularly in digital television receivers, video recorders, audio reproduction equipment, or computer-based or television-set-based multimedia processing equipment.

In the simplest case, such an interpolation is a linear interpolation, which starts from adjacent given values of the sampling sequence. This simple interpolation has a disadvantage in that it suppresses signal frequencies equal to half the sampling rate. In the case of vido signals, this reduces the picture sharpness, and may even cause clearly visible picture disturbances if such suppression results in interferences in the case of periodic picture contents.

U.S. Pat. No. 4,760,542, issued Jul. 26, 1988, incorporated by reference herein, discloses an interpolator for digital signals which circumvents part of these disadvantages by being implemented as a digital filter combination which contains, in the direction of signal flow, a discrete-time third-order interpolation filter and a linear interpolation filter. The discrete-time interpolation filter forms, in addition to the existing sample values, an intermediate value exactly in the middle between two sampling instants. Through the discrete-time filter, the sampling rate is effectively doubled. In the case of the discrete-time filter described, the frequency response in the passband for higher frequencies can be changed by increasing or decreasing particular frequency components by means of a weighting factor. Using a delay chain consisting of three delay stages and a logical combination of the differently delayed sample values, the individual frequency components are formed, which may be weighted differently by means of multipliers and are finally combined. By linear interpolation, the interpolated value is then calculated from the two closest secondary sample values of the new sampling sequence at the desired interpolating instant. To perform the linear interpolation, only a subtracter, a multiplier, and an adder are needed in the example given, with the mixture ratio of the two sample values being controlled by the multiplier and an applied multiplication factor. The multiplication factor corresponds to an interpolating instant normalized to the secondary sampling rate.

The filter function of this filter combination, however, does not meet the increased requirements placed on digital interpolation. It is therefore an object of the invention to provide an improved digital filter for performing an arbitrary temporal interpolation of a sampled signal which permits improved picture reproduction, particularly with digitized video signals.

SUMMARY OF THE INVENTION

This object is attained by providing a digital filter combination for interpolating primary sample values of a sampled signal using an mth-order discrete-time filter and a kth-order continuous-time interpolation filter, with $m \geq 3$ and $k \geq 2$; wherein the discrete-time filter forms n secondary sample values from at least m+1 primary sample values at equal time intervals, with $n \geq m$; and the continuous-time interpolation filter forms from at least part of the n secondary sample values an interpolated value whose temporal position with respect to that of the primary sample values is predeterminable by a normalized interpolating instant $dp+t_{in}/T$, where $t_{in}$ is the absolute interpolating instant, and T is the period of the primary sampling rate.

BRIEF DESCRIPTION OF THE DRAWINGS

The invention and further advantageous features thereof will now be explained in more detail with reference to the accompanying drawings, in which:

FIGS. 2 and 3 are schematic time diagrams of a primary sampling sequence and a secondary sampling sequence, respectively; and FIGS. 4 and 5 are time diagrams illustrating the selection of the sample values at different interpolating instants.

DETAILED DESCRIPTION OF THE INVENTION

Figure 1:
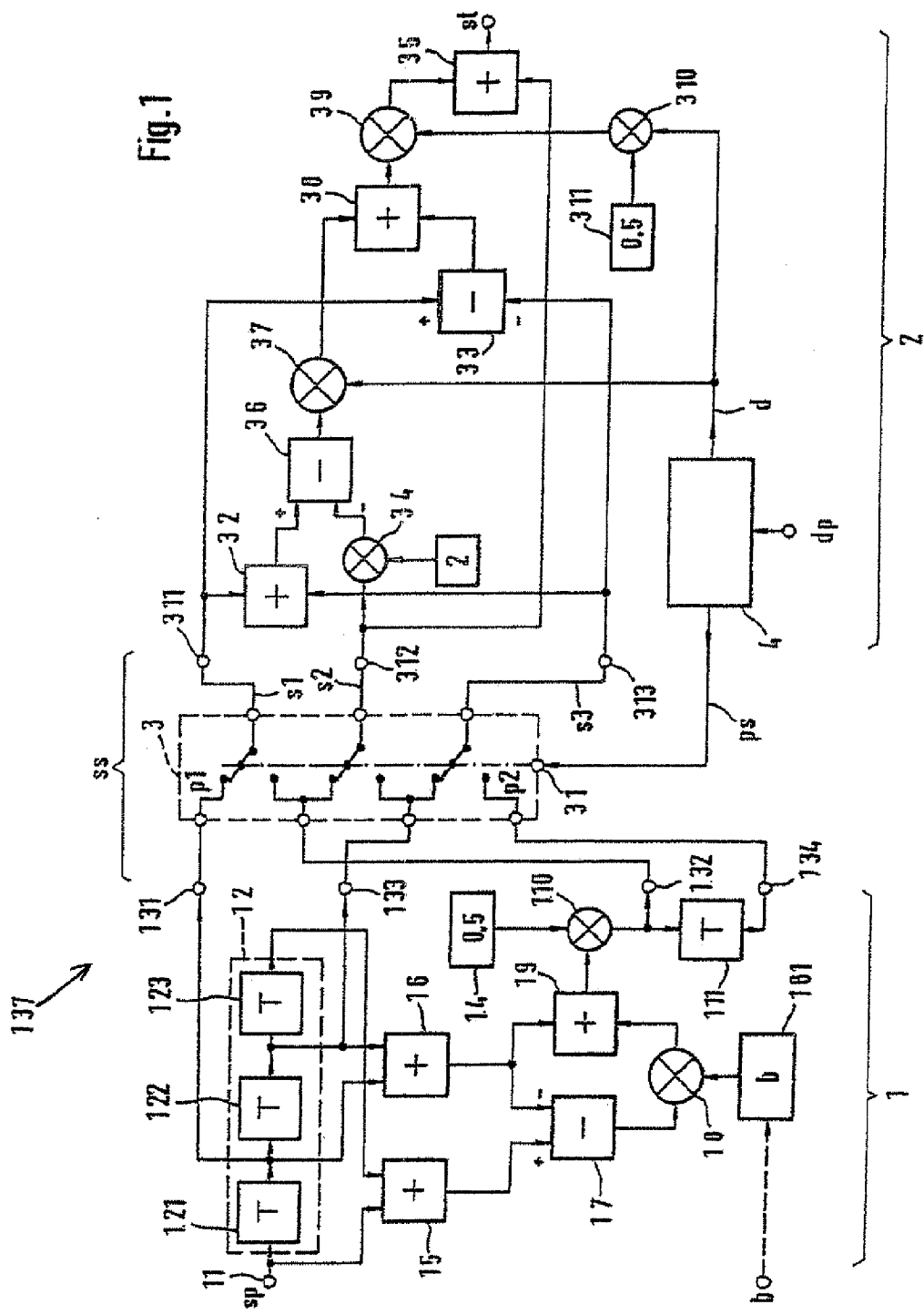
FIG. 1 is a schematic block diagram of an embodiment of a digital filter combination according to the invention.

Before embarking on a detailed discussion, the following should be understood. The invention is predicated on the recognition that the object can be attained with a digital filter combination consisting of a discrete-time filter for calculating fixed intermediate sample values and a continuous-time filter for calculating arbitrary intermediate values. The use of such a combination is advantageous because the two filter parts can be optimized independently of each other.

If the third-order discrete-time filter used in the circuit disclosed in copending application CDIT-1230 to calculate the fixed intermediate sample values were replaced by a fourth- or higher-order filter, this would have the advantage of giving a better amplitude response, but the disadvantage that, because of the impulse response extending over many sample values, the transient oscillation of the discrete-time filter would also extend over many sample values, which would interfere with the interpolation. Therefore, the order of the discrete-time filter is not changed. However, instead of the linear interpolation, which corresponds to a first-order interpolation, an at least second-order interpolation is used in the continuous-time filter. The interpolation polynomial is designed to be easy to implement as a monolithic integrated circuit incorporating the discrete-time filter. For the combined filter circuit it is irrelevant to what extent some functional units are implemented as separate circuit blocks or realized within a processor by means of a program.

Referring now to FIG. 1, there is shown an interpolation filter circuit 37 which contains a discrete-time filter 1 on the input side and a continuous-time interpolation filter 2 on the output side. The two filters are interconnected by a gang switch 3, whose control input 31 is supplied with a switching signal ps from a controller 4, which forms this signal in dependent on a predetermined normalized interpolating instant dp. An input 11 of discrete-time filter 1 receives primary sample values sp whose bandwidth is limited by the bandwidth of the original signal sg (see FIG. 2) and the Nyquist criterion. Input 11 is followed by a delay chain 12 consisting of three delay stages: 121, 122 and 123, which each provide a delay equal to the period T of the primary sample values sp. By different combinations of the primary sample values sp tapped from the delay chain 12, the individual frequency components for forming secondary sample values ss are formed. The embodiment of the discrete-time filter 1 shown in FIG. 1 requires only a signal genuine multiplier 18 and only four delay stages and four adder-subtracters. The circuit configuration with the three-stage delay chain 12 corresponds to a third-order discrete-time filter, which may also be implemented in another manner, of course.

The input of the first delay stage 121 is connected to the first input of a first adder 15, and the output of this delay stage is coupled to the first input of a second adder 16, whose second input is connected to the input of the third delay stage 123, whose output is coupled to the second input of the first adder 15. The outputs of the first and second adders 15 and 16 are connected, respectively, to the minuend input and the subtrahend input of a first subtracter 17, whose output is coupled through a first multiplier 18 to the first input of a third adder 19, whose second input is connected to the output of the second adder 16 and whose output is coupled through a second multiplier 110 to a second output 132 of discrete-time filter 1 and through a fourth delay stage 111, which provides a delay equal to the period T of the primary sampling clock, to a fourth output 134 of discrete-time filter 1. The second and fourth outputs 132 and 134 provide those interpolated sample values which lie exactly between the primary sampling instants, i.e., at the normalized instants $dp=\frac{1}{2}$ and $db=-\frac{1}{2}$, respectively, which correspond to the absolute instants $t=t_{-3/2}$ and $t=t_{-5/2}$, see FIG. 3.

In addition to the interpolated intermediate values, the secondary sample values ss also contain the original sample values sp. Since the discrete-time filter 1 provides at its outputs at least three adjacent secondary sample values at the same time, the delay chain 12 is tapped between the first and second delay stages 121, 122 and between the second and third delay stages 122, 123, and the signals available at the taps are transferred to a first filter output 131 and a third filter output 133, respectively. Thus, four successive secondary sample values ss are available simultaneously at the four outputs 131 to 134 of the discrete-time filter 1, and three of them are fed to the continuous-time interpolation filter 2 for forming the respective interpolated value st. The selection is made by the gang switch 3, whose output provides at least a first, second, or third sample value s1, s2, s3. The sampling instants of the four outputs 131 to 134 correspond in the same order to the four absolute instants $t_{-1}=-T$, $t_{-3/2}=-3T/2$, $t_{-12}=-2T$, and $t_{-5/2}=5T/2$. The period T* of the secondary sampling clock is T*=T/2.

In a first switch position p1, the gang switch 3 connects the outputs 131 to 133 to first, second, and third inputs 311, 312, and 313, respectively, of the continuous-time interpolation filter 2. In a second switch position p2, connections are established between the second to fourth outputs 132 to 134 and the three inputs 311 to 313. The association between the normalized interpolating instants $dp+t_{in}/T$ and $d=t*_{in}/T*$ and the respective secondary sample values ss to be tapped is apparent from FIGS. 4 and 5.

The second multiplier 110 only causes the output signal of the third adder 119 to be weighted with the factor ½, which may come from a data memory 14, for example. If the circuit is implemented in hardware, and binary-coded binary numbers are used, the second multiplier 110 will be replaced by a simple arithmetic shift. The first multiplier 18, however, is a genuine multiplier which multiplies by a filter coefficient b with which the frequency response in the passband at higher frequencies can be slightly accentuated or lowered. The control range of this filter coefficient b is relatively small: $-3/6 \leq b \leq -1/8$. The filter coefficient may be stored as a fixed or programmable value in a memory 181, for example. In mathematical form, the transfer function H(z) of the discrete-time filter 1 between the terminals 11 and 132 can be represented in the complex frequency domain as $$H(z)=b/2+(z^{-1}+z^{-2})x(1-b)x\frac{1}{2}+(z^{-3}x\,b/2)$$

The continuous-time interpolation filter 2 in FIG. 1 is designed to perform a second-order Lagrange interpolation with the three applied sample values s1, s2, and s3. The impulse response h(t) in the time domain of such a function is, for example, $$h(t)=(-1/8+t\times t/2)x6_{-1})(t)+(-9/8+3t-3t^2/2)\quad x6_{-1}(t-1)++(45/8-6t+3t^2/2)x6_{-1}(t-2)+(-35/8+3t+t^2/2)x6_{-1}(t-3)$$

where $6_{-1}(t)$ is a step function whose transition from the 0 state to the 1 state occurs at the instant t. The second-order Lagrange polynomial permits the determination of an interpolated value at the instant t via three equidistant sample points. The interpolated value may vary in time only within a range which extends over half the sample-point spacing on the right and the left of the middle sample point; see also the explanations of FIGS. 4 and 5.

The continuous-time interpolation filter 2 in FIG. 1 contains the three inputs 311, 312 and 313 for the simultaneous supply of the first, second, and third sample values s1, s2, and s3, respectively. The first input 311 is connected to the second input of a fourth adder 32 and to the minuend input of a second subtracter 33. The second input 312 is connected to a third multiplier 34 and to the first input of a fifth adder 35. The third input 313 is coupled to the first input of the fourth adder 32 and to the subtrahend input of the second subtracter 33. The output of the third multiplier 34 is connected to the subtrahend input of a third subtracter 36, whose minuend input is fed by the output of the fourth adder 32. The output of the third subtracter 36 is coupled to the input of a fourth multiplier 37, whose output is connected to the first input of a sixth adder 38, whose second input is connected to the output of the second subtracter 33. The output of the sixth adder 38 feeds a fifth multiplier 39, whose output is coupled to the second input of the fifth adder 35. The output of the fifth adder 35 provides the required interpolated value st. Since the third multiplier 34 only has to double the second sample value s2, it may be replaced by an arithmetic shift. The fourth and fifth multipliers 37, 39, however, perform genuine multiplications, namely by the interpolating instant d normalized to the period T* and by one half of the value of this instant, d/2. This half value d/2 can be formed either by means of an arithmetic shift or by means of a further multiplier 310, whose two inputs are supplied with the values d and ½, the latter from a data memory 311.

The controller 4 contains a comparator for forming the switching signal ps for the gang switch 3. For this, either the absolute interpolating instant $t_{in}$ or the normalized interpolating instant dp is evaluated. Furthermore, the controller 4 forms the interpolating instant d referred to the two closest secondary sample values ss, sp* and the associated period T* from the applied interpolating instants $t_{in}$ or dp, with $d=t*_{in}/T*$. The two normalized interpolating instants dp and d are henceforth called the primary and secondary interpolating instants dp and d, respectively. The relationship between the switching signal ps and the primary and secondary interpolating instants dp and d will become apparent from the description of FIGS. 4 and 5. While, the meaningful interpolation, the range for the primary interpolating instant dp extends from −1 to +1 at best, the range for the secondary interpolating instant d, which extends from −0.5 to +0.5, can only cover subranges thereof which adjoin each other without overlap. According to the first and second switch positions p1, p2, the resulting interpolation ranges p1, p2 are given in FIG. 5 beside the time axis for the primary interpolating instants dp.

If only negative or positive time ranges are permitted for the primary interpolating instant dp, they will extend between $0 \leq dp \leq 1$ or $-1 \leq p \leq 0$. In that case, too, any intermediate time value between two primary sampling instants $t_0$, $t_{-1}$, $t_{-2}$, ... can be implemented. The respective ranges for the switching signals ps which belong together are apparent from the switch positions p1, p2 given in FIG. 5.

For any interpolating instant $t_{in}$ within a period T, however, interpolation is also possible if a symmetrical time interval $-0.5 \leq dp \leq +0.5$ or an unsymmetrical time interval $-0.25 \leq dp \leq +0.75$ is selected for the interpolating instant dp. In the first case, three different switch position ranges p1, p2, p1 are necessary; in the second case, only the two switch-position ranges p1, p2 are required. Each switch position is assigned different secondary sample values ss, namely three groups of three in the first case and two groups of three in the second case. In the case of a limited interpolation interval, a single group of three may be sufficient. In that case, the lane switch 3 can be dispensed with.

The controller 4 forms the secondary interpolating instant d from the primary interpolating instant dp either by obtaining the latter from a stored table or by a simple modulo calculation $$d = dp +/- j,$$

with j=1, 2, 3, . . . having to be selected so that the range $-0.5 \leq d \leq +0.5$ will not be exceeded. In defining all range limits, ambiguities must be avoided, with the conditions of the respective numerical system having to be taken into account. In the two's complement system, the positive range of values, for example, excludes the power of two, $2^n$, as attainable limit values.

The schematic time diagram of FIG. 2 shows the analog signal sg, which is sampled at instants $t_{-3}$ to $t_1$. The resulting primary sample values sp represent a digitized data sequence. The period T of the primary sampling rate is constant. Therefore, the time axis can also be normalized to the period T, whereby normalized time values dp are formed, to which correspond the subscript values of the times t in FIG. 2. The formation of normalized time values dp is of advantage for the formation of the required interpolation value st. FIG. 2 shows temporally equidistant interpolated values st1, st2, st3, which may be assigned to a new sampling sequence, for example, the associated period Ts may be in an arbitrary numerical ratio to the original period T.

The time diagram of FIG. 3 shows a sequence of secondary sample values ss, which may be formed by the discrete-time filter 1 of FIG. 1, for example. Compared with the primary sampling sequence, the period T* of the secondary sampling sequence is halved, i.e., T*=T/2. The secondary sampling sequence contains the original sample values sp, which are denoted in FIGS. 3 to 5 by sp*.

With respect to the signal sg, the interpolating instant $t^*_{in}$ in FIG. 3 is identical to the interpolating instant $t_{in}$ of FIG. 2. The "*" is to indicate that in the case of the secondary sampling sequence, the interpolating instant has to be referred to the respective closest secondary sample value ss, which in FIG. 3 is identical with the primary sample value sp*.

For the interpolation in the continuous-time interpolation filter 2 of FIG. 1, groups of three adjacent secondary sample values ss are processed, the selection being made such that the interpolating instant $t^*_{in}$ is as close to a secondary sampling instant as possible. Examples of such a secondary group of three sample values ss are shown in FIGS. 4 and 5, with the permissible interpolation range $t^*_{in}$ in FIG. 4 being symmetrical about the secondary sample value ss at the instant $t_{-3/2}$, and that in FIG. 5 being symmetrical about the primary sample value sp* at the instant $t_{-23}$.

In the circuit example of FIG. 1, the selection of the sampling instants according to FIG. 4 or FIG. 5 is made by the gang switch 3 in conjunction with the controller 4. The temporal limitation of the respective interpolation range $t^*_{in}$ follows from the interpolation function of the continuous-time filter 2. Interpolated values st which lie outside the optimum interpolation interval—$½ \leq d \leq +½$ have greater deviations from the actual signal waveform sg than those interpolated values st which lie within that interval. It is therefore advantageous to use only those three sample values ss of the secondary sampling sequence which are closest to the interpolating instant $t_{in}$.

The time diagram of FIG. 4 corresponds to switch position p1 of gang switch 3, and the time diagram of FIG. 5 corresponds to switch position p2. Shown below the time axis of FIG. 5 is a further time axis which corresponds to the primary interpolating instant dp. For the practical application of the interpolation circuit according to the invention, it may be desirable for the interpolating instant $t_{in}$ to extend over two periods T, namely from a predetermined sampling instant to the preceding and subsequent sampling instants. This corresponds to the range of values from −1 to +1 for the primary interpolating instant dp. Above the associated time axis dp in FIG. 5, the associated switch positions p1, p2 are given. The associated secondary sample values ss are only shown for the time ranges of FIG. 4 and FIG. 5. Outside these time ranges, other triples of sample values ss must be used for the continuous-time interpolation in filter 2.

The invention claimed is:

1. A digital filter combination for interpolating primary sample values of a sampled signal using an mth-order discrete-time filter and a kth-order continuous time interpolation filter, with $m \geq 3$ and $k \geq 2$, wherein the discrete-time filter forms n secondary sample values from at least m+1 primary sample values at equal time intervals, with $n \geq m$, and the continuous-time interpolation filter forms from at least part of the n secondary sample values an interpolated value whose temporal position with respect to that of the primary sample values is predeterminable by a normalized interpolating instant $$dp = t_{in}/T,$$

where $t_{in}$ is the absolute interpolating instant, and T is the period of the primary sampling rate.

2. The filter combination according to claim 1, wherein the discrete-time filter is a third-order filter whose secondary sample values, including the primary sample values, correspond to a secondary sampling sequence whose data rate is twice that of the primary sample values, the discrete-time filter providing at its output end at least k secondary sample values for the continuous-time interpolation filter.

3. The filter combination according to claim 2, wherein the discrete-time filter further includes:
- a delay chain formed from at least a first delay stage, a second delay stage, and a third delay stage, each said delay stage providing a delay equal to the period T of the primary sampling rate;
- the input of the first delay stage being connected to a first input of a first adder, and the output of the first delay stage coupled to a first input of a second adder having its second input connected to the input of the third delay stage, whose output is coupled to a second input of the first adder; wherein
- the outputs of the first and second adders are connected, respectively, to the minuend input and the subtrahend input of a first subtracter having an output coupled through a first multiplier to a first input of a third adder which has a second input connected to the output of the second adder and whose output is coupled through a second multiplier to a second output of the discrete-time filter and through a fourth delay stage, which provides a delay equal to the period T of the primary sampling rate, to a fourth output of the discrete-time filter; and
- a tap between the first and second delay stages, said tap coupled to a first output of the discrete-time filter, and a second tap between the second and third delay stages coupled to a third output of the discrete-time filter.

4. The filter combination according to claim 1 wherein the continuous time interpolation filter implements a second-order Lagrange interpolation.

5. The filter combination according to claim 4, wherein the continuous-time interpolation filter includes:
- said continuous-time interpolation filter being fed from the discrete-time filter at first, second, and third inputs with the secondary sample values of the normalized instants dp=−1, −3/2, −2 or dp=−3/2, −2, −5/2, which define first, second, and third sample values;
- said first sample value being fed to the second input of a fourth adder and to the minuend input of a second subtracter;
- the second sample value being fed to a third multiplier and to the first input of a fifth adder;
- the third sample value being fed to the first input of the fourth adder and to the subtrahend input of the second subtracter;
- the output of the third multiplier being connected to the subtrahend input of a third subtracter whose minuend input is fed by the output of the fourth adder;
- the output of the third subtracter being coupled to the input of a fourth multiplier whose output is coupled to the first input of a sixth adder having its second input connected to the output of the second subtracter;
- the output of the sixth adder input to a fifth multiplier having its outputs coupled to the second input of the fifth adder; wherein
- the third multiplier performs a fixed multiplication by a factor of 2; and
- the fourth and fifth multipliers multiply the applied data values by the values of normalized secondary interpolating instants d and d/2, respectively, the normalized secondary interpolating instant d being formed by normalizing a secondary interpolating instant $t^*_{in}$ to the secondary sampling rate T*, with $$d=t^*_{in}/T^*,$$

and the secondary interpolating instant $t^*_{in}$ being referred to the closest secondary sample value.

6. The filter combination according to claim 1, wherein a gang switch controlled by the normalized interpolating instant dp and having at least a first switch position and a second switch position is interposed between the output of the discrete-time filter and the inputs of the continuous-time interpolation filter.

7. The filter combination according to claim 6, wherein the first switch position, the first, second, and third outputs of the discrete-time filter are connected, respectively, to the first, second, and third inputs of the continuous-time interpolation filter, and wherein the second switch position, the second, third, and fourth outputs of the discrete-time filter are connected, respectively, to the first, second, and third inputs of the continuous-time interpolation filter.

* * * * *